United States Patent [19]

Fujiwara et al.

[11] 3,963,662

[45] June 15, 1976

[54] POLYION COMPLEX AND PROCESS FOR PREPARATION THEREOF

[75] Inventors: Hiroshi Fujiwara, Soka; Masaaki Sekiya, Satte; Hiroshi Suzuki, Ichikawa, all of Japan

[73] Assignee: Maruzen Oil Co. Ltd., Osaka, Japan

[22] Filed: Mar. 13, 1974

[21] Appl. No.: 450,641

[30] Foreign Application Priority Data

Mar. 13, 1973 Japan................................ 48-29830
Mar. 13, 1973 Japan................................ 48-29831

[52] U.S. Cl................ 260/29.6 WB; 128/275; 210/41; 210/263; 260/2.1 M; 260/2.5 R; 260/2.5 F; 260/30.8 DS; 260/31.2 R; 260/31.2 N; 260/32.6 N; 260/32.8 N; 260/33.4 R; 260/47 UA; 260/844; 260/847; 351/160

[51] Int. Cl.².................... C08L 61/10; C08L 27/22

[58] Field of Search.............. 260/874, 51.5, 47 UA, 260/2.1 R, 2.1 E, 2.2 R, 2.1 M, 29.6 WB

[56] References Cited

UNITED STATES PATENTS

| | | | |
|---|---|---|---|
| 2,636,851 | 4/1953 | Juda et al.......................... | 260/2.1 R |
| 3,168,486 | 2/1965 | Small.............................. | 260/2.2 R |
| 3,335,100 | 8/1967 | Geyer............................. | 260/2.1 E |
| 3,467,604 | 9/1969 | Michaels........................... | 260/874 |
| 3,558,744 | 1/1971 | Michaels et al................... | 260/2.1 E |
| 3,645,922 | 2/1972 | Weiss et al....................... | 260/2.1 R |
| 3,839,237 | 10/1974 | Battaerd et al.................. | 260/2.1 R |

OTHER PUBLICATIONS

Polymer vol. 13 No. 4, pp. 141 and 184–186, Ferruti et al. 05-27-72.

*Primary Examiner*—Murray Tillman
*Assistant Examiner*—Thurman K. Page
*Attorney, Agent, or Firm*—Sughrue, Rothwell, Mion, Zinn & Macpeak

[57] ABSTRACT

A polyion complex derived from a polyanion and a polycation of the general formula

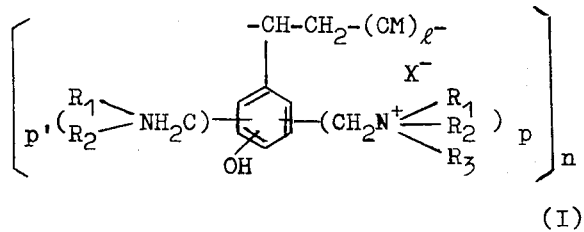

(I)

and a process for preparing the polyion complex. A film having superior water permeability and high strength can be prepared from the polyion complex. The film is usable as an ultra-filtering membrane or dialyzing membrane.

18 Claims, 2 Drawing Figures

SOLUBILITY EQUILIBRIUM CURVE
OF WATER-ACETONE-NaBr

POLYION COMPLEX AND PROCESS FOR PREPARATION THEREOF

BACKGROUND OF THE INVENTION

1. Field of the Invention

This invention relates to a novel polyion complex, that is, a polymeric electrolyte complex, and a process for preparing this polyion complex. More specifically, the invention relates to a process for preparing a novel polyion complex by complexing a polyanion with a polymer, as a polycation, having quaternary ammonium methylated hydroxystyrene units.

2. Description of the Prior Art

Conventional styrene-type polyion complexes can permit the introduction of only one quaternary ammonium methyl group at most on an average as a strong cationic group per unit of styrene, and when such a polyion complex is formed into a film, its ion density is low and the ionic bond power is insufficient. Accordingly, a film of good water permeability cannot be prepared from such a polyion complex. Conventional styrene-type polycations are expressed by the following formula

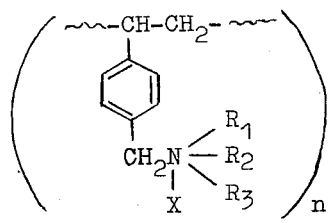

where $R_1$, $R_2$, $R_3$, X, and n are the same as those defined with respect to the general formula (I) to be given later.

SUMMARY OF THE INVENTION

It is an object of this invention to provide a polyion complex composed of a polycation of the general formula (I) and a polyanion. It is another object of this invention to provide a process for preparing a polyion complex composed of a polycation expressed by the general formula (I) and a polyanion. A further object of this invention is to provide a process for preparing a polyion complex from which a film of superior water permeability and high strength can be produced.

The polyion complex of this invention can be obtained by reacting a polyanion with a polycation of the general formula (I)

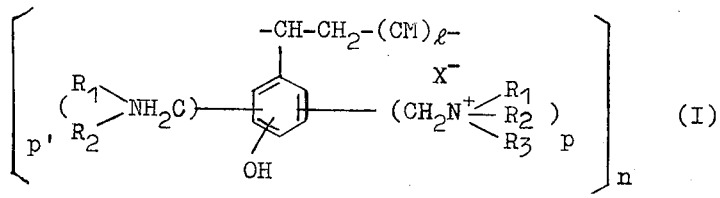

wherein OH is para or meta to —CH—CH$_2$; each of $R_1$, $R_2$ and $R_3$ is an alkyl group, cycloalkyl group, alkenyl group, substituted or unsubstituted benzyl group, or any of these groups having introduced thereinto a hydroxyl group, or $$-N\begin{matrix} R_1 \\ R_2 \end{matrix}$$

forms a nitrogen-containing or oxygen-containing heterocyclic group, or represents a dialkanol amine or N-alkyl alkanol amine, or $R_3$ is $CH_2COOH$, H, or O forming a coordination bond with N of the quaternary ammonium group;

X is halogen or $ROSO_3$ in which R is a lower alkyl group;

p is greater than 0 but below 2, p' is at least 0 but below 2, and the sum of p and p' is greater than 0 but below 2;

n is at least 3; (CM) represents a vinyl monomer; and l is any number including 0.

The following formula illustrates an example of structure of the polyion complex of this invention.

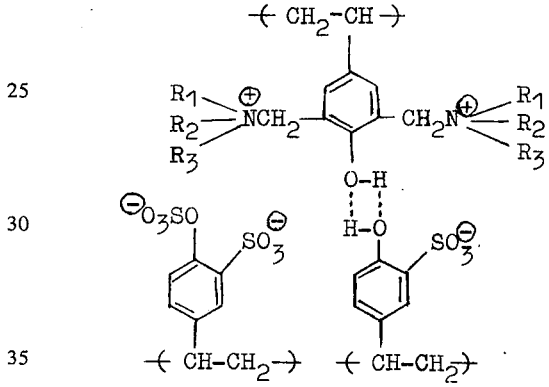

DESCRIPTION OF PREFERRED EMBODIMENTS

Figure 1:
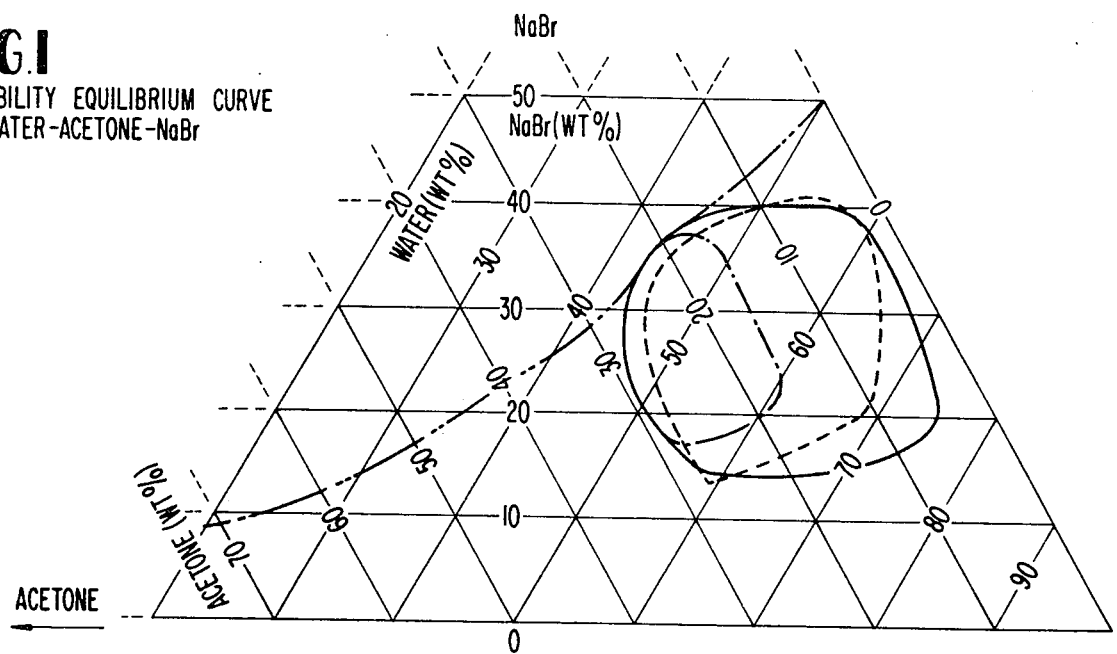
FIG. 1 is a solubility equilibrium curve of the polyion complex of this invention and a conventional polyion complex.

The hydroxystyrene which constitutes the skeletal structure of the polycation in this invention is para-hydroxystyrene or meta-hydroxystyrene. The polycation of formula (I) will be described in greater detail.

In the formula (I), each of $R_1$, $R_2$ and $R_3$ is a straight-chain or branched-chain alkyl group containing 1 to 20, preferably 1 to 4, carbon atoms, a cycloalkyl group containing 3 to 12, preferably 3 to 6, carbon atoms, an alkenyl group containing 2 to 20, preferably 2 to 4, carbon atoms, a benzyl group, a substituted benzyl group having a substituent such as an alkyl group containing 1 to 4 carbon atoms, a halogen atom, or a nitro group, or any of the above groups having introduced thereinto a hydroxyl group; or

forms a 4- to 6-membered nitrogen-containing or oxygen-containing heterocyclic group, such as pyrrole, pyrrolidine, imidazole, indole, piperidine, morpholine; or

represents a dialkanol amine, preferably the dialkanol amine having an alkanol group containing 1 to 4 carbon atoms, such as diethanolamine or dipropanolamine, or N-alkyl alkanol amine, preferably the N-alkyl alkanol amine having an alkyl group and an alkanol group containing 1 to 4 carbon atoms; or $R_3$ represents $CH_2COOH$, H, or O forming a coordination bond with N of the quaternary ammonium groups. X represents a halogen atom such as iodine, bromine or chlorine, or $ROSO_3$, in which R is a methyl or ethyl group. The symbol p represents a number greater than 0 but below 2, preferably at least 0.5 but not above 1.8. The symbol n represents a number of at least 3, preferably 100 to 20,000. (CM) represents a vinyl monomer. Any vinyl monomers which can be copolymerized with hydroxystyrene can be used, and suitable examples include styrene, methyl methacrylate, maleic anhydride, methyl acrylate, ethyl acrylate, acrylonitrile, acrylamide, and carboxylated products of these. The symbol l is any number. Generally, it is at least 0 but below 9, preferably, at least 0 but below 1. When l is 0, the compound of formula (I) is a homopolymer, and where it is not 0, the compound is a copolymer.

The ratio between the tertiary amino group and the quaternary ammonium group in the polycation may be arbitrary. Generally, the water-solubility of the polycation increases with increasing proportion of the quaternary ammonium group in the polycation. When the proportion of the quaternary ammonium group exceeds 20% of the total N-numbers, the properties of the quaternary ammonium groups begin to appear, and when it reaches about 50%, these properties appear very remarkably. Generally, therefore, polycations in which the proportion of the quaternary ammonium group is 20 to 100%, preferably 50 to 100%, are used.

Various polyanions can be used in this invention. For example, there can be used a homopolymer or copolymer of hydroxystyrene expressed by the following general formula, or a sulfonic acid group-containing polymer, such as poly(styrenesulfonic acid), poly(vinyltoluenesulfonic acid), or poly(vinyl sulfonic acid), or salts of these acid-type polyanions with alkali metals such as sodium or potassium, alkaline earth metals such as calcium, magnesium or barium, or ammonium. Of these, preferred polyanions are polyanions derived from homopolymers of hydroxystyrene, styrene or vinyl toluene, or copolymers of these monomers with other comonomers same as in the general formula (II). Polyanions derived from polymers or copolymers of hydroxystyrene or styrene are more preferred.

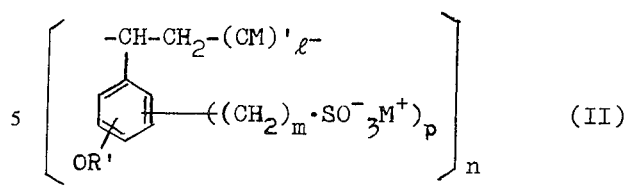

wherein p, l and n are the same as defined with respect to formula (I), m is 0 or 1; M is hydrogen, an ammonium group, an alkali metal such as sodium or potassium, or an alkaline earth metal such as calcium; R' is hydrogen, $-SO^-_3M^+$, $M^+$, or a combination thereof in which M is the same as defined above; OR' is para or meta to the vinyl group of the hydroxystyrene as a starting substance for synthesizing the polyanion; and (CM)' is styrene, methyl methacrylate, methyl acrylate, acrylonitrile or maleic anhydride.

The degree of polymerization may be chosen as desired, but generally, it is 100 to 20,000.

The polyion complex of this invention is prepared by contacting the polyanion with the polycation of the general formula (I) as solutions in solvent. The macroanion reacts ionically with the macrocation in solution to form the polyion complex. Examples of the solvent that can be used are water, at least one organic solvent miscible with water, two-component mixed solvents consisting of water and at least one of the organic solvent, and three-component mixed solvents consisting of water, at least one of the organic solvent, and an acid, base or salt. When the reaction is carried out in a single-component solvent or two-component solvent, the resulting polyion complex is precipitated. On the other hand, when a three-component solvent is used, the polyion complex is dissolved in it. Although removal of the solvent from the solution gives a polyion complex, the solution can be used directly as a casting solution for producing molded articles.

Generally the polyanion and the polycation are dissolved in separate solvents, and the two resultant solutions are contacted with each other. It is also possible to dissolve only one of the polycation and the polyanion in a solvent, and then adding the other in the resulting solution. Or a mixture of powders of the polycation and the polyanion is dissolved in the solvent. Such a method, however, is not general, although possible, since the progress of the reaction is irregular depending upon the conditions if one-component or two-component solvent is used.

The solvent may be any compound capable of dissolving the reactants and being inert to the reaction, and water is the most common solvent. Examples of the water-miscible organic solvents are alcohols containing 1 to 4 carbon atoms such as methanol or ethanol, organic acids containing 1 to 4 carbon atoms such as formic acid, acetic acid, propionic acid, butyric acid or isobutyric acid, 5- or 6-membered cyclic ethers such as tetrahydrofuran or dioxane, ketones containing 3 to 6 carbon atoms such as acetone or cyclohexanone, phenols such as phenol, cresol, or ethylphenol, and N-, S- or P-containing polar organic solvents such as acetonitrile, pyridine, N-methylpyrrolidone, morpholine, dimethyl formamide, dimethylsulfoxide, or hexamethyl phosphoramide.

The acid, base, and salt may be any compound which is capable of dissolving the polyion complex in the case of using the three-component solvent as described above. Examples of the acid are hydrochloric acid, hydrobromic acid, sulfuric acid, and trichloroacetic acid. Examples of the base are alkali metal or alkaline earth metal hydroxides such as sodium hydroxide, potassium hydroxide or calcium hydroxide, or aqueous ammonia. Examples of the salt include halides, nitrates, sulfates, perchlorates, and persulfates of alkali metals and alkaline earth metals, such as NaCl, NaBr, KCl, KI, $CaCl_2$, $MgCl_2$, $NaNO_3$, $Na_2SO_3$, $NaClO_4$, and $Na_2S_2O_8$.

The concentration of the polycation or the polyanion to be dissolved in solvent is generally 0.01 to 80% by weight, preferably 0.1 to 10% by weight. The temperature at which the polycation and the polyanion are brought into contact with each other is generally 0° to 100°C, preferably 15° to 60°C. Furthermore, the two are contacted so that the equivalent ratio of the polycation to the polyanion is generally 0.1 to 10, preferably 0.25 to 4. Where a three-component solvent is used, and the resulting solution of the polyion complex is used directly as a casting solution, it is better to increase the concentration of the solution a little bit; namely, the concentration is maintained at 2 to 80% by weight, preferably 10 to 50% by weight.

The reaction time depends upon the reaction temperature, but generally, it is 5 minutes to 20 hours, preferably 1 to 10 hours.

The degrees of polymerization of the polyanion and the polycation and p in the polycation can be chosen as desired. Polyanions and polycations having substantially the same degrees of polymerization are frequently used, but there will be no appreciable trouble even if one of them has a far higher degree of polymerization than the other.

The novel polyion complex of this invention has the following excellent characteristics over the conventional styrene-type polyion complexes.

1. Since it contains a hydrogen bond ascribable to the phenolic hydroxyl group in addition to an ionic bond between a strong cationic group, i.e. a quaternary ammonium group and a strong anionic group such as a sulfonic acid group, sulfomethyl group or sulfate group or a weak anionic group such as a carboxylic acid group, it possesses high water-permeability, and when formed into a film, it has high film strength.

2. By the structural characteristics of the phenol group of the polymer, at most about 2 quaternary ammonium methyl groups on an average can be easily introduced per unit of hydroxystyrene group, whereas with the conventional styrene-type polyion complex, only at most 1 such methyl group can be introduced. Similarly, when a polyhydroxystyrene-type polyanion is used, a sulfonic acid group, sulfomethyl group or sulfate group as a strong anionic group can be easily introduced in an amount of at most 3 on an average. As a result, the ion density of the resultant polyion complex becomes high, and the ionic bond force also becomes higher. Thus, there can be obtained a polyion complex film having superior water-permeability and high film strength.

3. The polyhydroxystyrene forming the skeleton of the polycation used in this invention can be easily produced by a known method. By properly choosing polymerization conditions, polymers having a molecular weight ranging from several hundred to several million can be prepared. This, therefore, enables the production of polycations of desired molecular weights. Copolymers of hydroxystyrene with other vinyl monomers such as styrene, methyl methacrylate or maleic anhydride can also be used. The hydroxystyrene unit of the polymer or copolymer can be easily tertiary-aminomethylated by a Mannich reaction using a secondary amine. Any amine can be used for the aminomethylation of the hydroxystyrene unit, and the degree of aminomethylation can be easily controlled by properly adjusting the reaction conditions. The tertiary-aminomethylated hydroxystyrene unit can be easily quaternized by, for example, a Menshtokin reaction. By selecting the conditions properly at this time, the ratio of the quaternary ammonium salt as a strong cationic group to the tertiary amino group as a weak cationic group can be adjusted. A polycation having other functional group attached thereto can also be prepared. For example, when it is desired to obtain a polycation having a carboxylic acid group introduced thereinto, a copolymer of hydroxystyrene with maleic anhydride, acrylic acid or an acrylate is subjected to a Mannich reaction, or a reagent containing a carboxylic acid group, such as a haloacetic acid, is used at the time of quaternization to introduce the carboxylic acid group simultaneously with the quaternization. Thus, according to this invention, a novel polyion complex having freely and chemically prescribed factors such as the ion density, ion space, ion strength and the type of ion can be afforded, because of the characteristics of the polycation used.

4. When sulfonated polyhydroxystyrene derived from polyhydroxystyrene is used in this invention as a polyanion, the molecular weight of polyhydroxystyrene forming the skeleton of this polyanion can be varied over a wide range of several hundred to several million by properly choosing the polymerization conditions. Copolymers of hydroxystyrene with other vinyl monomers such as styrene, methyl methacrylate or maleic anhydride can be used as a starting material for the polyanion, and the degree of introduction of a sulfonic acid group, sulfomethyl group or sulfate group into the hydroxybenzene ring can be easily adjusted by properly choosing the reaction conditions. If a copolymer containing a carboxyl group or a compound capable of permitting easy introduction of a carboxyl group as a comonomer, a carboxyl group as a weak anion can be introduced. Accordingly, in the same way as in the case of the polycation described above, the ion density, ion space, ion strength or the type of ion of the polyanion can be freely and chemically prescribed, and the properties of the novel polyion complex of this invention can be freely controlled as desired.

5. Since the polyion complex of this invention contains a phenolic hydroxyl group, it can be cross-linked by heat-treatment or treatment with formaldehyde, and the density of cross-linkage is high.

The novel polyion complex of this invention can find application as an ion adsorbing resin, a coating agent, an artificial tissue of the living body, a microporous sponge or filter, semi conductor element or a temperature sensitive element. Especially, films prepared from the polyion complex can be used as an ultrafiltration membrane or dialyzing membrane for a medical polymeric material such as an artificial kidney, artificial lung, or contact lens, or for the separation or purification of enzymes, proteins or nucleic acid, or the disposal of waste liquids in the foodstuff industry.

The polyion complex of this invention can be formed into molded articles. For example, films of the polyion complex can be prepared in the following way.

The polyion complex is dissolved in the three-component solvent described above in a concentration of generally 2 to 80% by weight, preferably 10 to 50% by weight to form a casting solution. When the above three-component solvent is used for producing the polyion complex, the resulting solution is used as such or after adjusting its concentration to the desired value, as the casting solution.

Preferably, in order to remove the gas contained in the solution, the solution is deairated at reduced pressure, usually about 1 to 10 mmHg for a suitable period of time, preferably for 20 to 30 seconds.

The casting solution-obtained was cast on a flat smooth plate such as a glass plate, preferably treated with silane or paraffin at its surface, and the thickness of the coating is adjusted preferably by using an applicator, for example. Or if desired, the solution is coated on a support such as a polyolefin sintered product (e.g., Tyvek, product of Du Pont). In order to remove the solvent, the coating is dried in air at a temperature of generally 10° to 100°C, preferably 15° to 60°C, for a period of generally 30 seconds to 20 hours, preferably 2 to 30 minutes, thereby to make the upper surface of the film denser than the lower surface. A film having a denser upper layer and a less dense lower layer is generally desirable as a permeating membrane.

Then, the polyion complex cast on the flat smooth plate or support is immersed in water or a mixture of water with a water-miscible organic solvent at a temperature of generally −10° to +100°C, preferably 0° to 60°C at a pH of 1 to 13, and peeled off from the flat plate after the three-component solvent has been removed and the film has been gelled. Thus, a novel polyion complex film can be produced. When the support is used, the polyion complex is obtained in the form carried on the support.

The polyion complex can be cross-linked by heating or by treatment with formaldehyde. For example, it can be cross-linked by heating it at 15° to 100°C, preferably 50° to 80°C, for 5 minutes to 20 hours, preferably 1 to 10 hours. Or it can be cross-linked by immersing it in a 1–40% by weight aqueous solution of formaldehyde at 0° to 100°C, preferably 15° to 60°C for 1 to 20 hours. This cross-linking treatment makes it possible to adjust the pore diameter of micropores present in the polyion complex. A catalyst such as an acid or alkali can be used for the cross-linking treatment, but the use of a catalyst is not altogether necessary. When it is used, a small amount, generally 1/10 to 1/100% by weight based on the formaldehyde, of sodium hydroxide, potassium hydroxide, hydrochloric acid, or sulfuric acid is added.

The method for producing the polycation used in this invention will be described (see U.S. Pat. application Ser. No. 365,325).

The polyhydroxystyrene skeleton is synthesized by the cationic, radical or heat-polymerization of hydroxystyrene, or by radical polymerization of p-acetoxystyrene followed by saponification (M. )). al., J. Polm. Sci, A-1, 7 (8) 2405 (1969), A-1 4 (11) 2771–80, 1966, and B 7 (8) 605 (1969) ).

A copolymer of it with a vinyl monomer can be obtained by a well known method. For example, copolymerization of polyhydroxystyrene and acrylonitrile or ethyl acrylate is disclosed in British Pat. No. 691,038; copolymerization of polyhydroxystyrene and methacrylate or styrene is described in J. Polym. Sci A-1, 7 (8) 2175 (1969); and copolymerization of polyhydroxystyrene and methylacrylate is disclosed in Japanese Pat. OPI No. 22187/'73.

The hydroxystyrene unit in the polyhydroxystyrene or the copolymer of hydroxystyrene with a vinyl monomer is subjected to a Mannich reaction using a secondary amine thereby to tertiary-aminomethylate it. The reaction proceeds as schematically shown below. All the symbols in the formula, such as $R_1$, $R_2$, $p$, $n$, (CM) and $l$ are the same as defined with respect to the general formula (I).

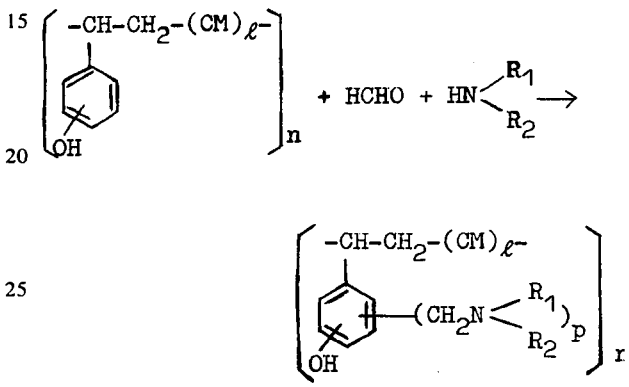

The formaldehyde may be formaldehyde itself or a compound capable of yielding formaldehyde in the reaction mixture, for example, paraformaldehyde. Amines that can be used are secondary amines having the same $R_1$ and $R_2$ groups as in the above general formula (I). Generally, secondary amines such as dimethyl amine, diethyl amine, pyrrole, pyrrolidine, diethanol amine, piperidine or morpholine can be used.

The molar ratio of the formaldehyde to the amine is generally 3/2 to 2/3, and the amine is generally used in an amount of 50 to 500% of the stoicheometrical amount required for the hydroxystyrene unit.

An alkali aqueous solution, an alcohol having 1 to 4 carbon atoms, an organic acid having 1 to 4 carbon atoms, a cyclic ether such as dioxane or tetrahydrofuran, dimethyl formamide, acetonitrile, or a mixture of water with any of these organic solvents is used as a solvent, and the concentration of the starting material in such a solvent is adjusted to about 0.1 to 20% by weight, preferably 1 to 10% by weight.

Generally, the reaction is performed in an autoclave. The reaction temperature is 0° to 200°C, preferably 20° to 150°C. The reaction time varies according to the reaction temperature, but usually 1 hour or more. Generally, the reaction ends within 48 hours. The reaction product is separated by filtration, and dried at reduced pressure at 20° to 50°C.

Then, the reaction product is subjected to a Menshtokin reaction or reacted with a dialkyl sulfate, or an inorganic acid to form the polycation to be used in this invention. The reaction equation is as follows:

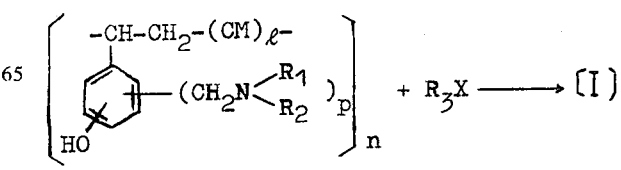

Compounds $R_3X$ are those having $R_3$ and X as defined in formula (I), for example, an alkyl halide such as methyl chloride, a dialkyl sulfate such as diethyl sulfate, hydrochloric acid, sulfuric acid, formic acid, chloroacetic acid, chloroethyl alcohol, or chlorohydrin. The reaction is carried out generally at 20° to 150°C in a solvent for the reactants, for example, an alcohol containing 1 to 8 carbon atoms, a ketone such as acetone, or methyl ethyl ketone, tetrahydrofuran, dimethyl formamide, dimethyl sulfoxide, or hexamethyl phosphoramide. Generally, $R_3X$ is used in an amount of 1 to 10 times the equivalent of one amino group of the starting material. The amount of the starting material in the solvent is generally 1 to 10% by weight. Those having a high molecular weight may sometimes render the reaction product insoluble if used in high concentrations, and therefore, in such a case, the concentration should be lowered. The reaction ends usually in 3 to 24 hours, and up to about 48 hours. The reaction can be performed either in an autoclave or in an open vessel. The product is separated by filtration, or is precipitated by using a non-solvent such as ethyl acetate, dimethyl ether or benzene.

The ratio of the tertiary amine to the quaternary ammonium in the polycation is determined by the amount of a quaternizing reagent for the starting material. For example, when methyl bromide is used as the reagent, the reaction proceeds almost quantitatively. Substantially the same tendency is observed with other reagents, but according to the type of the reagent, the proportion of the quaternary ammonium differs. This can be known easily from experiments.

Examples of the method for preparing the polyanion used in this invention include a method involving sulfonating polyhydroxystyrene with conc. sulfuric acid, or a method comprising dissolving polyhydroxystyrene in dioxane or acetic acid and then sulfonating it with chlorosulfonic acid (cf. "Macromolecular Syntheses," 3, 140, John Wiley & Sons Inc., New York, J. Chem. Soc. 2617 (1964)). Further, polymerization of a salt of sodium, potassium or the like of styrenesulfonic acid is described in J.A.C.S. 76 720 (1954), R. H. Willey et al. For example, the method can be schematically shown as follows:

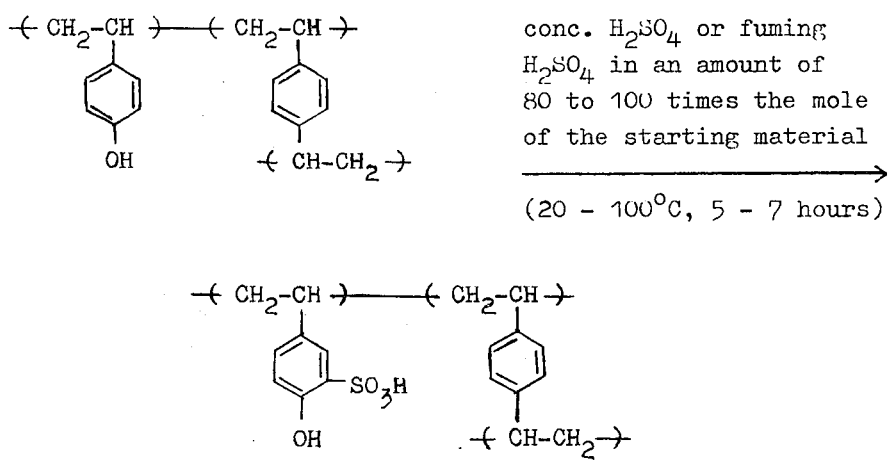

One gram of poly-p-hydroxystyrene ($[\eta] = 0.06$ in tetrahydrofuran at 30°C) having a molecular weight of 4,000 was dissolved little by little in 100 ml of conc. sulfuric acid under cooling (ice water at 0°C), and allowed to react for 7 hours at 100°C, followed by cooling to 25°C. The reaction product was diluted with 1 liter of water under cooling (ice water at 0°C). The pH of the product was adjusted to 7 with 1N sodium hydroxide, followed by dialysis. After lyophilizing, 0.6 g of a white powdery solid was obtained.

Preparation of Polycation of Formula (I)

The manufacture and mean molecular weight of the poly-p-hydroxystyrenes used in the examples are shown in the Table I.

Table I

| | Manufacture | Mean Molecular Weight |
|---|---|---|
| A | Thermal Polymerization | 5,000 – 10,000 |
| B | Cationic Polymerization | 200,000 – 350,000 |
| C | Saponification of Poly-p-acetoxystyrene (Saponification value = 100%) | 1,000,000 – 2,000,000 |

Preferred and exemplary polymerization conditions are:

| Polymerization Condition | Reaction Temperature | Reaction Time | Catalyst | Solvent |
|---|---|---|---|---|
| Thermal polymerization | 140 – 150°C | 4 hrs | — | Ethylphenol |
| Cationic polymerization | −20 – −30°C | 5 – 10 mins | $BF_3$ ether | Methylene chloride |
| Radical polymerization | 40 – 60°C | 10 – 20 hrs | Azobisisobutyronitrile | Tetrahydrofuran (or bulk polymerization) |

In the following examples, all reactions were at normal pressure, unless otherwise indicated.

EXAMPLE I

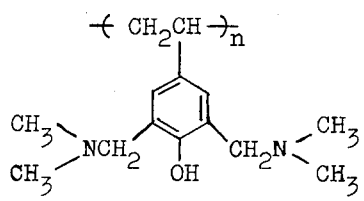

In a 200 cc pressure glass reaction vessel with a stirrer, in which case autogeneous pressure was used, 5 g of poly-p-hydroxystyrene (B) was dissolved in 100 cc of ethanol, a 40% aqueous solution containing 3.8 g of paraformaldehyde and 3.8 g of dimethylamine was added, stirred at room temperature for about 1 hour and then reacted at 80°C for about 5 hours.

The reaction product was cooled to room temperature and then added to a large amount of water to precipitate and recover the polymer. By drying at 30° to 40°C under vacuum for about 24 hours, 8.0 g of a white to pale brown powder polymer was obtained.

The polymer had an N content of 10.9% by elemental analysis and was determined to be dimethylaminomethylated poly-p-hydroxystyrene from the results of IR and NMR analysis as given below. 1.65 dimethylaminomethyl radicals were introduced per hydroxystyrene unit.

NMR: $\delta = 2.25$ ppm (6H, NCH$_3$), $\delta = 3.50$ ppm (2H, $\phi$—CH$_2$N) in 10 wt.% acetone at 34°C

EXAMPLE II

According to the same procedure as in Example I, 5 g of poly-p-hydroxystyrene (B) was dissolved in 150 cc of ethanol, and 3.8 g of paraformaldehyde and 5.6 g of dimethylamine (40% ethanol solution) were added and reacted for 8 hours while maintaining the temperature at 90°C in the pressure reaction vessel.

The reaction product was treated as in Example I to yield 8.0 g of a white powder polymer. The resulting polymer had a nitrogen content of 11.5% and the introduction of dimethylaminomethyl radical was 1.85 per hydroxystyrene unit.

EXAMPLE III

According to the same procedure as in Example I, 1.4 g of formaldehyde (37% aqueous solution) and 3.3 g of diethylamine were added to 5 g of poly-p-hydroxystyrene (A) dissolved in 100 ml of ethanol and reacted at 80°C for 2 hours.

The reaction product was treated as in Example I to yield 6.5 g of a pale brown powdery polymer, a 40% of which consisted of an insoluble polymer in the form of a gel. The acetone-soluble fraction had an N-content of 6.06, which corresponded to a diethylaminomethyl radical introduction of 0.83 per hydroxystyrene unit.

EXAMPLES IV – X 3.0 g of poly-p-hydroxystyrene (A) was reacted with various kinds of secondary amines (in an amount as shown in Table II) and 2.3 g of paraformaldehyde in ethanol or an aqueous alkaline solution (pH = 12 without including effect of amine) (50 cc). The results obtained and the reaction conditions are shown in Table II below.

Table II

| Example | Reagent Amine (g) | Solvent | Temp. (°C) | Time (hr) | Polymer Yield (g) | [N]* % by weight | [N]* Monomer |
|---|---|---|---|---|---|---|---|
| IV | n-Dibutylamine 6.5 | Ethanol | 78 | 4.0 | 3.7 | 4.8 | 0.8 |
| V | Diallylamine 5.1 | Aqueous NaOH | 65 | 2.0 | 2.6 | 5.3 | 0.9 |
| VI | Pyrrolidine 3.6 | Ethanol | 78 | 3.0 | 4.7 | 7.8 | 1.3 |
| VII | Piperidine 4.3 | Ethanol | 95 | 3.5 | 3.2 | 5.1 | 0.7 |
| VIII | Morpholine 4.4 | Ethanol | 78 | 4.0 | 3.4 | 5.1 | 0.7 |
| IX | Diethanolamine 5.3 | Ethanol | 90 | 5.0 | 3.9 | 5.5 | 0.9 |
| X | Diphenylamine 8.5 | THF** | 66 | 2.0 | 6.3 | 5.3 | 1.4 |

*[N] is number of nitrogens per unit of p-hydroxystyrene in the polycation expressed by the formula (I).
**Tetrahydrofuran

EXAMPLE XI

Each 1 g of tertiary aminomethylated poly-p-hydroxystyrene obtained in Examples I to IX formed a salt in a 10 ml of aqueous solution of an equivalent amount of hydrochloric, sulfuric, nitric, phosphoric, formic, acetic, chloroacetic or maleic acid, and dissolved completely in water. The polymer obtained in Example X was linear but insoluble in aqueous hydrochloric acid.

EXAMPLE XII

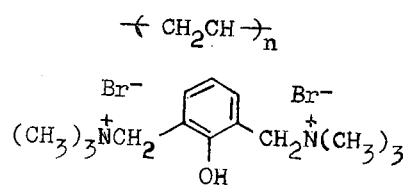

After dissolving 3 g of dimethylaminomethylated poly-p-hydroxystyrene as prepared in Example II in about 100 cc of methanol, about 3 g of methyl bromide was added thereto and the system allowed to stand at room temperature for 24 hours. The reaction liquid was poured in ethyl acetate to yield a water soluble pale yellow polymer.

According to elemental analysis, the bromine content in the polymer after drying was 27.0%. From the results of IR and NMR analysis ($\delta = 3.21$ ppm (9H, NCH$_3$), $\delta = 4.65$ ppm (2H, $\phi$—CH$_2$—N) in heavy water at 34°C), it was determined that the polymer was the quaternary ammonium salt. The ratio of quaternized tertiary amine groups to initial amino groups in the starting polymer was calculated as 55% from the bromine content.

EXAMPLE XIII

Methyl iodide replaced methyl bromide used in Example XII and the system reacted similarly. In this case, the polymer was insoluble in methanol due to the quaternization and separated from the system. The iodine content of the polymer after drying was 21%, from which the reaction ratio to the tertiary amino group was 46%.

EXAMPLES XIV — XX

According to the procedure of Example I, 5 g of poly-p-hydroxystyrene (A) was reacted with 3.8 g of dimethylamine and 3.4 g of paraformaldehyde in 100 cc ethanol at 80°C for 4 to 5 hours. Recovering and analysis of the polymer were the same manner as in Example I.

This starting material was quaternized with various kinds of halides and the results as well as the reaction conditions are shown in Table III below. Reaction pressure was at 1 atm. except for Example XIV (5 atms) and XV (5 atms).

and IR analysis (absorptions at 1,253 cm$^{-1}$, 1,214 cm$^{-1}$, 1,060 cm$^{-1}$ and 758 cm$^{-1}$ resulted from SO of CH$_3$OSO$_3^-$ and at 1,380 cm$^{-1}$ and 1,000 cm$^{-1}$ resulted from CH$_3$O of CH$_3$OSO$_3^-$) and elemental analysis (N = 5.2% and S = 12.8%) confirmed that the polymer was the quaternary ammonium salt containing CH$_3$OSO$_3^-$ as opposite ion. The reaction ratio was about 100%.

EXAMPLE XXII 2.1 g of dimethylaminomethylated poly-p-hydroxystyrene produced as in Example XXI having 1.6 dimethylaminomethyl groups per hydroxystyrene unit was dissolved in 50 cc of methanol and about 7 g of $\alpha$-chloro-p-nitrotoluene was added into the polymer solution and the system reacted at 65°C for 8 hours. The reaction liquid was poured into ethyl acetate to yield 2 g of a water-soluble polymer in the form of a white-skin colored powder. The results of NMR and IR analysis (absorptions at 1,525 cm$^{-1}$, 1,350 cm$^{-1}$ and 885 cm$^{-1}$ resulted from the nitro group) and elemental analysis (N = 9.2% and Cl = 11.3%) confirmed that the polymer was the quaternary ammonium salt having the p-nitrobenzyl radical. The reaction ratio was about 100%.

EXAMPLE XXIII

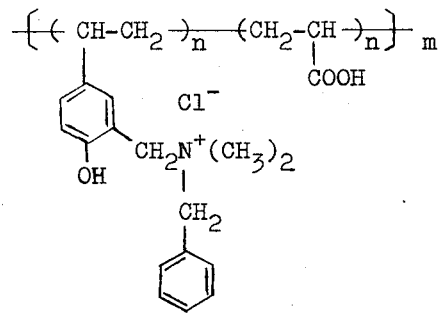

Table III

| Example | Reaction Condition | | | | | | Reaction Product | | |
|---|---|---|---|---|---|---|---|---|---|
| | N-Content in Diamino-methylated Polymer (%) | Halogen Compound | Solvent (150 ml) | N in Polymer/ Halogen (mol ratio) | Reaction Temp. (°C) | Reaction Time (hr) | Halogen in Polymer (wt.%) | Reaction Conversion (%) | Solubility (H$_2$O) |
| XIV | 10.9 | Methyl Bromide | Methanol | ⅓ | 65 | 6.0 | 29 | 98 | ⊙ |
| XV | 10.0 | Allyl Bromide | Methanol | ⅓ | 25 | 24.0 | 26 | 90 | ⊙ |
| XVI | 10.0 | Allyl Chloride | Methanol | ⅓ | 65 | 10.0 | 10 | 63 | ⊙ |
| XVII | 10.0 | Octyl Chloride | HMPT | ⅓ | 95 | 5.0 | 8.6 | 39 | ⊙ |
| XVIII | 10.0 | Octadecyl Chloride | HMPT | ¼ | 100 | 20.0 | 8.2 | 40 | Δ |
| XIX | 10.1 | Benzyl Chloride | Methanol | ¼ | 55 | 4.0 | 14.0 | 100 | ⊙ |
| XX | 10.0 | Chlorohydrin | Dimethylformamide | ¼ | 150 | 1.5 | 7.4 | 29 | Δ |

⊙ good;
Δ not good;
HMPT: Hexamethylphosphoroamide

EXAMPLE XXI 2.1 g of dimethylaminomethylated poly-p-hydroxystyrene prepared from the polyhydroxystyrene (A) in Examples XIV – XX having 1.6 dimethylaminomethyl groups per hydroxystyrene unit was dissolved in 50 cc of methanol and about 4 cc of dimethyl sulfate was added and the system reacted at 65°C for 2 hours. The reaction liquid was poured into ethyl acetate to yield 3 g of a white water-soluble polymer. The results of NMR A copolymer of p-hydroxystyrene and acrylic acid (1:1 molar) was reacted with dimethylamine and paraformaldehyde in dimethylformamide-aqueous solvent system according to the Mannich reaction to yield a dimethylaminomethylated p-hydroxystyrene-acrylic acid copolymer (1.67 dimethylaminomethyl groups per copolymer unit). The Mannich reaction conditions were:

polymer/amine/aldehyde = 1.4/1/1 (weight ratio)

1/3/4.5 (equivalent ratio); reactants concentration in the mixing solvent of dimethylformamide-water: (70 – 30 vol %): 10 wt%; temperature: 80°C; time: 4 hours.

The copolymer was quaternized with benzyl chloride in methanol to yield a white powdery polymer. The quaternization conditions were:

benzyl chloride/N in polymer = 2/1 (mol ratio); reactants concentration: 51 wt%; temperature: room temperature; time: 24 hours.

Elementary analysis: N = 4.7% and Cl = 11%.

EXAMPLE XXIV

A copolymer of p-hydroxystyrene and acrylonitrile (p-hydroxystyrene content: 63 mol%) was reacted with a 40% dimethylamine aqueous solution and paraformaldehyde in a dimethylformamide-ethanol solvent system at a temperature of 80°C for 4 hours according to the Mannich reaction to yield a dimethylaminomethylated p-hydroxystyrene-acrylonitrile copolymer having 1.4 dimethylaminomethyl groups per hydroxystyrene unit.

The copolymer thus obtained was further reacted with methyl bromide in methanol at a temperature of 65°C for 5 hours to yield a white powdery trimethylammoniummethylated p-hydroxystyrene-acrylonitrile bromide copolymer. The results of quaternized elementary analysis: N = 7.6% and Br = 30%, confirmed that the copolymer was completely quaternized. The copolymer thus obtained had good solubility in water.

EXAMPLE XXV 2.0 g of a radical copolymer of p-hydroxystyrene and styrene (p-hydroxystyrene content: 67 mol%) was reacted with 1.0 g of 40% dimethylamine aqueous solution and 1.0 g of paraformaldehyde in 100 ml tetrahydrofuran as a solvent at room temperature for 1 hour and the reaction was further continued at a temperature of 66°C for 2 hours (Mannich reaction).

The reaction solution was precipitated in water to yield a white powdery polymer. The results of elementary analysis: N = 5.6%, confirmed that about 1 dimethylaminomethyl group per a hydroxystyrene unit was introduced.

2.0 g of the copolymer was reacted with 2.0 g of methyl bromide in a 100 ml methanol-tetrahydrofuran solvent system at a temperature of 65°C for 5 hours to yield white, powdery trimethylammoniummethylated p-hydroxystyrene-styrene bromide copolymer. The results of elementary analysis: N = 4.2%, Br = 24%, confirmed that the polymer was completely quaternized. The polymer thus obtained had good solubility in water.

EXAMPLE XXVI 4.4 g of the radical copolymer of p-hydroxystyrene and ethylacrylate (p-hydroxystyrene content: 50 mol%) was reacted with 7.7 ml of 40% dimethylamine aqueous solution and 1.7 g of paraformaldehyde in 100 ml of ethanol at room temperature for 1 hour. The reaction was further continued at a temperature of 80°C for 4 hours (Mannich reaction).

The reaction solution was precipitated in water to yield a white, powdery polymer. The results of elementary analysis: N = 5.39%, confirmed that the polymer was dimethylaminomethylated p-hydroxystyrene-ethylacrylate copolymer having 1.36 dimethylaminomethyl groups per hydroxystyrene unit.

4 g of the copolymer was hydrolyzed with 10 ml of 4% sodium hydroxide aqueous solution and 50 ml methanol at a temperature of 65°C for 5 hours to yield the dimethylaminomethylated p-hydroxystyrene-acrylic acid copolymer.

2.9 g of the copolymer obtained above was quaternized with 6.0 g dimethyl sulfate in 100 ml methanol.

The results of elementary analysis: N = 4.2% and S = 9.6%, confirmed that almost all nitrogen was quaternized. The copolymer had good solubility in water.

The following Examples illustrate the present invention in greater detail. In the Examples, various values, not specifically defined, represent the following.

$[\eta]$: Intrinsic viscosity measured on a 0.1N-NaBr aqueous solution at 30°C.
[N]: Number of nitrogens per unit of p-hydroxystyrene in the polycation expressed by the formula [I].
[S]: Number of $SO_3M$ per unit of p-hydroxystyrene in sulfonated poly-p-hydroxystyrene.
Equivalent ratio: Ratio of polycation to polyanion.
Solvents A, B and C are as follows:
Solvent A: Water-acetone-NaBr=51-18-31 (wt.%)
Solvent B: Water-1,4-dioxane-dimethyl sulfoxide-conc. aqueous solution of hydrobromic acid = 10/10/1/20 (weight ratio).
Solvent C: Water-1,4-dioxane-dimethyl sufoxide-conc. aqueous solution of hydrobromic acid = 17/17/17/49 (wt.%)
Room temperature = 20°–30°C.

EXAMPLE 1

A 1-liter beaker was charged with 0.5 g of trimethylammoniummethylated poly-p-hydroxystyrene bromide having an [N] of 1.60, a Br/N=1.0, and an $[\eta]$ of 0.084, and 250 ml. of water, and the mixture was thoroughly stirred to form a solution.

Separately, a 500 ml. beaker was charged with 0.5 g of a Redox polymer ($[\eta]$=0.438) of sodium p-styrenesulfonate and 250 ml. of water, and the mixture was thoroughly stirred to form a solution. Then, the polyanion aqueous solution so prepared [poly(sodium p-styrenesulfonate)] was added dropwise to the polycation aqueous solution prepared above (trimethylammoniummethylated poly-p-hydroxystyrene bromide) at room temperature, thereby to form a white precipitate (the equivalent ratio being 0.9). The mixture was stirred for 1 hour at room temperature, and the resulting polyion complex precipitate was separated by filtration, washed thoroughly with water, treated with acetone, and dried in vacuo. There was obtained 0.16 g of a yellowish white powder of polyion complex. The elemental analysis values as found for this product were N=3.81%, S=7.47%, and N/S=1.17. The IR spectrum showed that absorptions exist at 1205 cm$^{-1}$ (coupling of $\delta OH$ with $\nu CO$ or $\nu SO_2$), 1180 cm$^{-1}$ ($\nu_{as}SO_2$), 1033 cm$^{-1}$ and 1008 cm$^{-1}$ ($\nu_s SO_2$), 670 cm$^{-1}$ ($\nu SO$), and 875 cm$^{-1}$ and 830 cm$^{-1}$ (out-of-plane of $\delta OH$ of multisubstituted benzene nucleus). From this, it was confirmed that the product was a polyion complex resulting from the ionic bonding of the polycation and the polyanion.

The resulting polyion complex was well soluble in both solvents A and B.

EXAMPLE 2

0.8 g of the polycation and 0.35 g of the polyanion, both same as those used in Example 1, were reacted in the same way as in Example 1 (equivalent ratio 1.8) to form 0.05 g of a white powder of polyion complex. The elemental analysis values as found for the product were N=3.85%, S=6.23%, N/S=1.41. Furthermore, the ionic structure of the product was confirmed by the IR spectrum. The polyion complex obtained was well soluble in solvent B, although sparingly soluble in solvent A.

EXAMPLE 3

0.35 g of trimethylammoniummethylated poly-p-hydroxystyrene bromide ([N]=1.60, Br/N=1.0, [$\eta$]=0.563) derived from poly-p-hydroxystyrene having a number average molecular weight of 190,000 was reacted with 0.7 g of the same polyanion as used in Example 1 in the same way as in Example 1 (the equivalent ratio 0.46), to form 0.4 g of a yellowish white powder of polyion complex. The elemental analysis values as found for the product were N=3.37%, S=8.90%, Br=less than 0.3%, N/S=0.86. The resulting polyion complex was well soluble in both solvents A and B.

EXAMPLE 4

0.05 g of N,N-dimethyl-N-benzylammoniummethylated poly-p-hydroxystyrene chloride ([N]=1.60, Cl/N=1.0, [$\eta$]=0.104) was reacted with 0.5 g of the same polyanion as used in Example 1 in the same way as in Example 1 (the equivalent ratio 0.80) to afford 0.41 g of a pale brown powder of polyion complex. The elemental values as found for this product were N=2.68%, S=7.49%, N/S=0.82. The IR spectrum showed that absorptions exist at 1216 cm$^{-1}$ (coupling of $\delta$OH with $\nu$CO or $\nu$SO$_2$), 1180 cm$^{-1}$ ($\nu_{as}$SO$_2$), 1038 cm$^{-1}$ and 1009 cm$^{-1}$ ($\nu_s$SO$_2$), 670 cm$^{-1}$ ($\nu$SO$_2$), 885 cm$^{-1}$ and 830 cm$^{-1}$ (out-of-plane of OH of a substituted benzene ring), and 700 cm$^{-1}$ and 755 cm$^{-1}$ (out-of-plane of $\delta$OH of the benzyl group). From this, the structure of the polyion complex was confirmed. The resulting polyion complex was well soluble in solvent B, although sparingly soluble in solvent A.

EXAMPLE 5

The polyanion used in Example 1 was the same as that used in Example 4, but the polycation used in Example 1 was different in structure from that used in Example 4. Specifically, the polycation used in Example 1 contained a trimethylammonium group, whereas the polycation used in Example 4 contained a dimethylbenzyl ammonium group. In this Example, the solubilities of these two polyion complexes obtained in Examples 1 and 4 in a water/acetone/NaBr solvent were examined in detail, and solubility equilibrium curves were obtained. These curves are shown in FIG. 1 in comparison with the solubility equilibrium curve of a conventional polyion complex derived from polyvinylbenzyltrimethylammonium chloride (number average molecular weight 760,000) as a polycation and poly(-sodium p-styrenesulfonate) as a polyanion. The solubility curves for the polyions of Example 1, Example 4, and the conventional technique are shown respectively by a solid line, one-dot chain line, and broken line. It is seen from FIG. 1 that the ion concentration of the polyion complex containing a methyl group is high (since the methyl group is less hydrophobic than the benzyl group), and this polyion complex is soluble in the above solvent even when the amount of acetone as an organic solvent is small. It can also be concluded from the results obtained that the polyion complex of Example 1 containing 1.6 trimethylammonium methyl groups per unit of p-hydroxystyrene has a wider range of solubility than the conventional styrene-type polyion complex containing 1.0 trimethylammonium methyl group at most per unit of styrene.

EXAMPLE 6

0.51 g of the same polycation as used in Example 1 was dissolved in 25 ml. of water with stirring to form an aqueous solution of the polycation. On the other hand, 0.51 g of sulfonated poly-p-hydroxystyrene (S=17.0%) obtained by reacting poly-p-hydroxystyrene having a number average molecular weight of 4000 and an [$\eta$], as measured in tetrahydrofuran at 30°C., of 0.06 with conc. sulfuric acid was dissolved in 25 ml. of water with stirring to form an aqueous solution of polyanion. The two aqueous solutions were mixed at room temperature with stirring, and further stirred at room temperature for one hour to form a polyion complex as a black brown precipitate. Filtration of this precipitate yielded 0.95 g of a solid. The elemental analysis values as found for this solid product were N=3.54%, S=7.63%, N/S=1.06. The IR spectrum showed that absorptions existed at 1220 cm$^{-1}$ (coupling of $\delta$OH with $\nu$SO or $\nu$SO$_2$), 1170 cm$^{-1}$ ($\nu_{as}$SO$_2$), 1043 cm$^{-1}$ ($\nu_s$SO$_2$), 647 cm$^{-1}$ and 614 cm$^{-1}$ ($\nu$SO), and 883 cm$^{-1}$, 836 cm$^{-1}$ and 811 cm$^{-1}$ (out-of-plane of $\delta$OH of a multi-substituted benzene ring). From this, the structure of the polyion complex was confirmed. The resulting polyion complex was not soluble in solvent A, but soluble in solvent B. Also, it was well soluble in solvent C.

EXAMPLE 7

0.5 g of the same polycation as used in Example 4 was reacted with 1.0 g of sulfonated poly-p-hydroxystyrene ([S]= 1.85, [$\eta$]=0.421) derived from poly-p-hydroxystyrene having a number average molecular weight of 150,000 as a polyanion in the same way as in Example 1 (the equivalent ratio 1.32) to form 0.9 g of a white powder of polyion complex. The elemental analysis values as found for the product were N=3.24%, S=7.05%, N/S=1.05. The structure of this product was confirmed by the IR spectrum. The resulting polyion complex was well soluble in any of the solvents A, B and C.

EXAMPLE 8

One gram of trimethylammoniummethylated poly-p-hydroxystyrene bromide ([N]=1.55, Br/N=1.0, [$\eta$]=0.402) derived from poly-p-hydroxystrene having a number average molecular weight of 150,000 as a polycation was taken in a 10 ml. beaker, and 1 ml. of solvent C was added to form a plate white brown clear viscous solution. Separately, one gram of a Redox polymer of sodium p-styrenesulfonate ($[\eta]$=0.623) as a polyanion was taken is a 10 ml. beaker, and 1 ml. of solvent C and 1 ml. of water were added to form a pale yellow clear viscous solution. The equivalent ratio of the polycation to the polyanion at this time was 0.90.

The polyanion solution and the polycation solution were uniformly mixed, and stirred for 5 minutes to form a solution of polyion complex in a concentration of 31% by weight. The solution was maintained at 1 to 10 mmHg at room temperature for 20 to 30 seconds to remove the bubbles present in the solution. The resulting solution was cast on a flat glass plate having a size of 15 cm × 10 cm, and the thickness of the coating was adjusted to about 0.1 mm using a applicator for chromatography. The coating formed was heated at room temperature for 2 minutes to evaporate off the solvent, and slowly immersed gently in ice water at 0°C. The coating became whitish in about 30 seconds, and in 5 minutes, a film of the polyion complex came off from the glass plate. After 1 hour from the immersion, the polyion complex film was immersed in water at 25°C., and allowed to stand for one hour in this state. The resulting whitish yellow semi-transparent film had a water content of 62.4%, a thickness of 0.140 mm, a water-permeability of 0.027 ml./min.-cm$^2$ (1 Kg/cm$^2$), a tensile strength of 24 Kg/cm$^2$, and an ultrafiltration property (solute rejection) of 0% for creatinine, 2.4% for vitamin B$_{12}$, 10% for trypsin, and 98.2% for hemoglobin.

1.8. The properties of the resulting polyion complex films are shown in Table 1.

Table 1

| Examples | Equivalent ratio (polycation/polyanion) | Thickness (mm) | Water content (%) | Polyion complex films produced Water permeability (ml./min. − cm$^2$) (1Kg/cm$^2$) | Tensile strength (kg/cm$^2$) | Elongation (%) | Appearance |
|---|---|---|---|---|---|---|---|
| 11 | 1.81 | 0.207 | 79.6 | 0.704 | 3 | 10 | Colorless transparent film |
| 12 | 0.90 | 0.121 | 63.8 | 0.028 | 21 | — | Whitish yellow semi-transparent film |
| 13 | 0.50 | 0.150 | 75.6 | 0.032 | 15 | — | Pale whitish yellow semi-transparent film |
| 14 | 0.30 | 0.164 | 83.1 | 0.028 | 6 | — | Pale white semi-transparent film |

Figure 2:
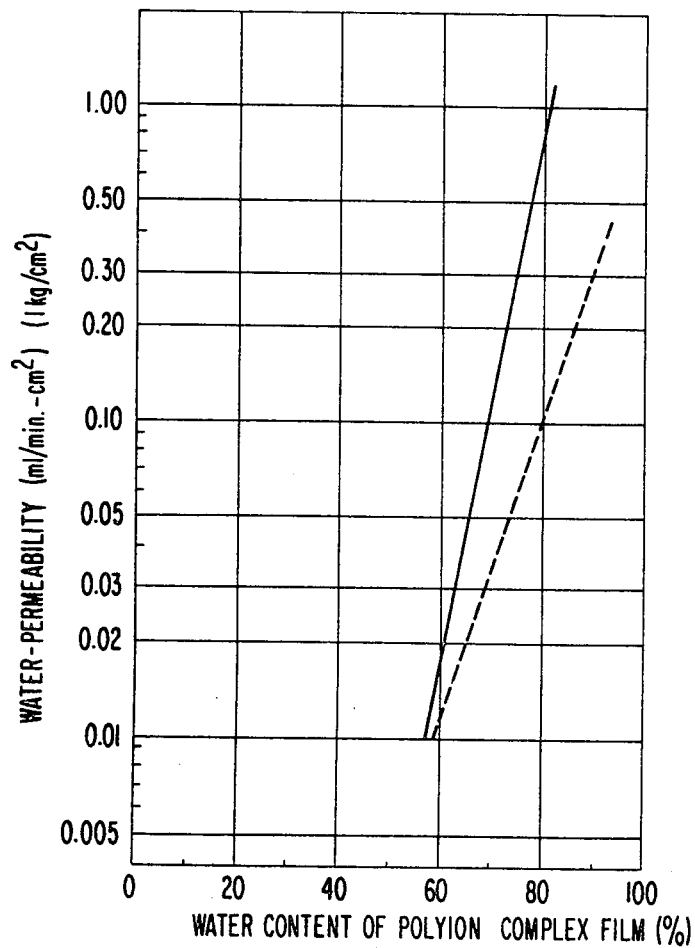
FIG. 2 is a graphic representation showing the relation between the water content and water permeability of films prepared from the polyion complex of this invention and the conventional polyion complex.

The relation between the water content and water-permeability of each of the polyion complex films prepared in Examples 8 to 14 is shown in FIG. 2 in comparison with that of the conventional styrene-type polyion complex film. It is seen from FIG. 2 that the films prepared from the polyion complexes of this invention have a higher water-permeability even when the water content is the same. This is probably because the ion density of the polyion complex of this invention is high since the polycation derived from poly-p-hydroxystyrene contains about 1.6 trimethylammoniummethyl groups per unit of the p-hydroxystyrene (with the conventional styrene-type polycation, the maximum number of this group is 1.0 per unit of the styrene); and also the polyion complex of this invention has a phenolic hydroxyl group and thus forms a hydrogen bond, which in turn makes the water-permeability higher.

EXAMPLE 9

A polyion complex film was prepared in the same way as in Example 8 except that the concentration of the casting solution was changed to 20%. The resulting film was a white, slightly transparent film having a water content of 74.7%, a thickness of 0.29 mm, a water-permeability of 0.292 ml/min.-cm$^2$ (1 Kg/cm$^2$), and a tensile strength of 9 Kg/cm$^2$.

EXAMPLE 10

A polyion complex film was prepared inn the same way as in Example 8 except that the concentration of the casting solution was changed to 15%. The resulting film was a white non-transparent film having a water content of 79.3%, a thickness of 0.53 mm, and a water-permeability of 0.768 ml/min.-cm$^2$ (1 Kg/cm$^2$).

EXAMPLES 11 to 14

Polyion complex films were prepared in the same way as in Example 8 except that the equivalent ratio of the polyycation to the polyanion was changed to 0.3 to

EXAMPLE 15

A polyion complex film was prepared in the same way as in Example 8 except that a Redox polymer of sodium p-styrenesulfonate ($[\eta]$=0.623) was used as a polyanion, trimethylammoniummethylated poly-p-hydroxstyrene bromide ($[N]$=0.87, $[\eta]$=0.450) was used as a polycation, the equivalent ratio was changed to 0.71, and the concentration of the casting solution was changed to 21%. The resulting film was a white semi-transparent film having a thickness of 0.115 mm, a water-content of 74.8%, a water-permeability of 0.030 ml/min.-cm$^2$ (1 Kg/cm$^2$), a tensile strength of 14 Kg/cm$^2$, and an ultrafiltration property (solute rejection) of 4.8% for vitamin B$_{12}$, 16.8% for trypsin, and 95.7% for hemoglobin. The film of this Example in which the amount of the ammoniummethyl group introduced was low had low water-permeability.

EXAMPLES 16 to 21

A polyion complex was cast in the same way as in Example 8 except that trimethylammoniummethylated poly-p-hydroxystyrene bromide ($[N]$=1.71, $[\eta]$=0.343) derived from poly-p-hydroxystyrene was used as a polycation, a Redox polymer of potassium p-styrenesulfonate ($[\eta]$=2.79) was used as a polyanion, the equivalent ratio of the polycation to the polyanion was maintained at 1.0, the concentration of the casting solution was changed to 20–22% by weight, and the solvent for the casting solution consisted of water, each of the organic solvents indicated in Table 2 below, and concentrated aqueous solution of hydrobromic acid in a ratio of 20/30/50 by weight%. The properties of the resulting polyion complex films are shown in Table 2. The temperature at the time of dissolution was 25°C. If the composition of the solvent mentioned above is changed, the solubility of the polyion complex also changes. One of the best-soluble polyion complexes dissolves in the solvent in an amount of about 400 to 500 g per liter of the solvent.

p-styrenesulfonate ($[\eta]=0.640$) as a polyanion and trimethyammoniummethylated poly-p-hydroxystyrene bromide ($[N]=0.87-1.71$, $Br/N=1$, $[\eta]=0.3-0.6$) as a polycation at an equivalent ratio of 1.0. The properties of the resulting films are shown in Table 3. It is seen from Table 3 that the film of Example 23 in which the amount of the ammoniummethyl group introduced was low had low water permeability.

Table 2

| Examples | Organic solvents | Solubility of polyion complex* | Thickness (mm) | Water content (%) | Polyion complex films | | Solute rejection (%) | |
|---|---|---|---|---|---|---|---|---|
| | | | | | Water permeability** | Tensile strength ($Kg/cm^2$) | Vitamin $B_{12}$ | Cytochrome C |
| 16 | Hexamethyl phosphoramide | A | 0.19 | 77 | 0.11 | 12 | 0 | 100 |
| 17 | Dimethyl sulfoxide | B | 0.21 | 81 | 0.18 | 9 | 3 | 100 |
| 18 | Dimethyl formamide | A | 0.19 | 79 | 0.18 | 8 | 3 | 100 |
| 19 | Dioxane | C | 0.22 | 82 | 0.17 | 7 | 4 | 100 |
| 20 | Tetrahydrofuran | C | 0.23 | 83 | — | 1 | — | — |
| 21 | Isopropanol | B | 0.22 | 81 | 0.11 | 8 | 18 | 100 |

*A: very well soluble,
B: well soluble,
C: sparingly soluble
**ml./min.–$cm^2$ (1 $Kg/cm^2$)

Table 3

| Examples | Polycation* | | Concentration of the casting solution (%) | Thickness (mm) | Water content (%) | Polyion complex films | | Ultrafiltration property (solute rejection %)*** | |
|---|---|---|---|---|---|---|---|---|---|
| | [N] | [η] | | | | Water permeability** | Appearance | Vitamin $B_{12}$ | Cytochrome C |
| 23 | 0.87 | 0.450 | 17 | 0.082 | 79.7 | 0.040 | colorless transparent film | 2.4 | 100 |
| 24 | 1.30 | 0.547 | 21 | 0.087 | 64.8 | 0.048 | slightly pale yellow transparent film | 9.5 | 100 |
| 25 | 1.47 | 0.563 | 21 | 0.115 | 71.4 | 0.067 | pale yellowish white semi-transparent film | 13.5 | 100 |
| 26 | 1.71 | 0.343 | 20 | 0.092 | 72.5 | 0.182 | White non-transparent film | 4.0 | 100 |

*The molecular weight of cation-polymerized poly-p-hydroxystyrene was 100,000 to 200,000.
**ml/min.–$cm^2$ (1 $Kg/cm^2$).
***The ultrafiltration test was performed using two films.

EXAMPLE 22

A polyion complex was prepared in the same way as in Example 1 using 0.5 g of trimethylammoniummethylated poly-m-hydroxystyrene bromide ($[N]=1.0$, $[\eta]=0.075$) derived from poly-m-hydroxystyrene having a number average molecular weight of 200,000 and 0.5 g of poly(sodium p-styrenesulfonate) ($[\eta]=0.438$). The resulting polyion complex was a white powder, and the amount yielded was 0.4 g. The elemental analysis values as found for this product was $N=3.30\%$, $S=7.72\%$ and $N/S=0.98$.

A polyion complex film was prepared from the resultant polyion complex in the same way as in Example 8. The film had a water-permeability of 0.065 ml/min.-$cm^2$ (1 $Kg/cm^2$), and completely inhibited the passage of cytochrome C having a molecular weight of 12,400.

EXAMPLES 23 to 26

Polyion complex films were prepared in the same way as in Example 8 using a Redox polymer of sodium

EXAMPLE 27

The substantially same film as that in Example 8 (thickness 0.117 mm, water-permeability 0.036 ml/min.-$cm^2$ (1 $Kg/cm^2$), solute rejection 0% for vitamin $B_{12}$ and 100% for hemoglobin was immersed for 1 hour in water at 60°C., whereupon its water-permeability became 0.035 ml/min.-$cm^2$ (1 $Kg/cm^2$), and its solute rejection for vitamin $B_{12}$ became 1.4%.

EXAMPLE 28

When substantially the same film as in Example 8 (thickness 0.117 mm, water-permeability 0.036 ml/min.-$cm^2$ (1 $Kg/cm^2$) was immersed in an aqueous solution of formaldehyde at room temperature for 4 hours, the resulting film had a thickness of 0.146 mm, and a water-permeability of 0.022 ml/min.-$cm^2$ (1 $Kg/cm^2$).

EXAMPLES 29 to 33

Polyion complex films were prepared in the same way as in Example 8 using a Redox polymer of potassium p-styrenesulfonate ($[\eta]=2.79$) as a polyanion and trimethylammoniummethylated poly-p-hydroxystyrene bromide ($[N]=0.87-1.80$, $Br/N=1$, $[\eta]=0.3-0.6$) as a polycation in an equivalent ratio of 1.0. The properties of the resulting films are shown in Table 4.

EXAMPLE 36

((Polycation Copolymer — Polyanion Homopolymer))

25g of an alternating copolymer of p-hydroxystyrene and maleic anhydride (p-hydroxystyrene content, 50 mol%; number average molecular weight, about 200,000) was dissolved in 200 ml of tetrahydrofuran. 18 g of para-formaldehyde and 51 ml of a 40% aqueous solution of dimethylamine were added to the solution Table 4

| Examples | Polycation [N] | Polycation [η] | Concentration of the casting solution(%) | Thickness (mm) | Water content (%) | Water permeability** | Appearance | Ultrafiltration property (solute rejection) (%) vitamin $B_{12}$ | Ultrafiltration property (solute rejection) (%) Cytochrome C |
|---|---|---|---|---|---|---|---|---|---|
| 29 | 0.87 | 0.450 | 6.0 | 0.108 | 80.7 | 0.066 | Pale white transparent film | 0 | 100 |
| 30 | 1.30 | 0.547 | 8.7 | 0.100 | 73.0 | 0.097 | Pale white semi-transparent film | 0 | 100 |
| 31 | 1.47 | 0.563 | 9.9 | 0.105 | 84.3 | 0.332 | White, slightly transparent film | 0 | 100 |
| 32 | 1.71 | 0.343 | 11.7 | 0.155 | 83.8 | 0.398 | White non-transparent film | 0 | 100 |
| 33* | 1.80 | 0.580 | 20 | 0.124 | 70.5 | 0.033 | White semi-transparent film | 0 | 100 |

*The tensile strength was 25 Kg/cm²
**The water-permeability was the value in ml/min.-cm² (1 Kg/cm²).

It is seen from Table 4 that the film of Example 29 in which the amount of the ammoniummethyl group introduced was low had low water-permeability, and the film of Example 33 in which the concentration of the casting solution was high had high tensile strength but somewhat low water-permeability.

EXAMPLE 34

A pale white semi-transparent polyion complex film was prepared in the same way as in Example 8 using 0.5 g of sulfonated poly-p-hydroxystyrene ($[S]=1.0$, $[\eta]=0.628$) obtained by dissolving poly-p-hydroxystyrene (number average molecular weight 110,000) in dioxane and sulfonating it with chlorosulfonic acid as a polyanion and 0.5 g of trimethylammoniummethylated poly-p-hydroxystyrene bromide ($[N]=1.71$, $[\eta]=0.343$) as a polycation in an equivalent ratio of 0.75, and changing the concentration of the casting solution to 22%. The resulting film had a thickness of 0.135 mm, a water content of 69.0%, and a water-permeability of 0.067 ml/min.-cm² (1 Kg/cm²).

EXAMPLE 35

A polyion complex film was prepared in the same way as in Example 34 except that the concentration of the casting solution was changed to 12.8%, and the equivalent ratio of the polycation to the polyanion was changed to 1.44. The resulting film was a white non-transparent film having a thickness of 0.105 mm, a water content of 75.3%, a water-permeability of 0.107 ml/min.-cm² (1 Kg/cm²), and an ultrafiltration property (solute rejection) of 0% for vitamin $B_{12}$, 94% for cytochrome C, and 85% for hemoglobin.

followed by a Mannich reaction at a temperature of 65°C for 5 hours to obtain 30 g of a dimethylaminomethylated copolymer. Elementary analysis of the resulting copolymer showed an N-content of 8.0%. This copolymer was used as a polycation in the subsequent preparation of a polyion complex.

56 g of poly-p-hydroxystyrene (number average molecular weight, about 300,000) was dissolved in 2 l of dioxane and 270 g of chlorosulfonic acid was then added to the solution to effect a sulfonation reaction at a temperature of 80°C for 3 hours. The resulting reaction mixture was allowed to cool to room temperature and poured into n-hexane to obtain a precipitate of a polyanion. The precipitate was then dissolved in 500 ml of water and the solution was dialized against distilled water using a cellulose tube (available from Visking Corp.) to remove the sulfuric acid and hydrochloric acid. The resulting dialysate was concentrated using an evaporator and then freeze-dried to obtain 95 g of a white-ocherous sulfonated poly-p-hydroxylene. Elementary analysis of the resulting compound showed a C-content of 38.0%, an H-content of 4.6%, an S-content of 14.4% and [S] of 1.14. This compound was used as a polyanion in the subsequent preparation of a polyion complex.

0.5 g of the above obtained polycation was dissolved in 100 ml of a 10% aqueous hydrochloric acid solution. Separately, 0.5 g of the above obtained polyanion was dissolved in 100 ml of water. The aqueous solution of the polyanion thus prepared was then added dropwise to the aqueous hydrochloric acid solution of the polycation at room temperature while stirring (the equivalent ratio of the polycation to the polyanion is 0.51) to form a polyion coomplex as a white precipitate. After allowing to react at room temperature for an additional one hour with stirring, the precipitated polyion complex was filtered, washed thoroughly with water, substituted with acetone and then dried in vacuo to obtain 0.5 g of a white powdered polyion complex. Elementary analysis of this polymer showed an N-content of 3.9%, an S-content of 7.8% and an N/S ratio of 1.14. IR analysis of the polymer showed characteristic absorptions at 1590 cm$^{-1}$ and 1407 cm$^{-1}$ ($\nu$co of the carboxylate), in the vicinity of 1200 cm$^{-1}$ (the coupling of $\delta$OH and $\nu$co or $\delta$so$_2$), at 1033 cm$^{-1}$($\nu$so$_2$), at 1005 cm$^{-1}$($\nu\lambda$ c—N0, at 880 cm$^{-1}$ and 827 cm$^{-1}$ (outside a $\delta$OH plane of multi-substituted benzene ring), and at 670 cm$^{-1}$($\nu$so). From the above results, it was confirmed that the product obtained above is a polyion complex in which the polycation and the polyanion are combined ionically. This polyion complex was found to be easily soluble in Solvent C.

EXAMPLE 37

(Polycation Copolymer—Polyanion Homopolymer)

10 g of the polycation as prepared in Example 36 was dissolved in methanol, and then quaternized by reacting with 10 g of methyl bromide at 65°C for 3 hours and the quaternized polycation was re-precipitated with a large amount of ethyl acetate to obtain 13 g of a trimethylammoniummethylated copolymer. Elementary analysis of this copolymer showed an N-content of 4.6%, a Br-content of 23% and a Br/N ratio of 0.88. This copolymer was used as a polycation in the subsequent preparation of a polyion complex. The polyanion used in this example was the same compound as used in Example 36.

0.5 g of the above obtained polycation was dissolved in 100 ml of water. Separately, 0.5 g of the polyanion (prepared in Example 36) was dissolved in 100 ml of water. The aqueous solution of the polyanion thus prepared was then added dropwise to the aqueous solution of the polycation at room temperature while stirring (the equivalent ratio of the polycation to the polyanion is 0.40) to form a polyion complex as a white precipitate. After allowing to react at room temperature for an additional one hour with stirring, the precipitated polyion complex was filtered, washed thoroughly with water substituted with acetone and then dried in vacuo to obtain 0.34 g of a white powdered polyion complex. Elementary analysis of this polyion complex showed an N-content of 3.2%, an S-content of 7.7% and an N/S ratio of 0.95. From the results of IR analysis, the product obtained above was found to be a polyion complex in which the polycation and the polyanion are combined ionically. This polyion complex was found to be easily soluble in Solvent C.

EXAMPLE 38

(Polycation Copolymer—Polyanion Hoomopolymer)

0.9 g of a radical copolymer of p-hydroxystyrene acrylonitrile (p-hydroxystyrene content, 60 mol%; number average molecular weight, about 70,000) was dissolved in 100 ml of tetrahydrofuran. 3 ml of diethylamine and 0.7 g of paraformaldehyde were added to the solution followed by a Mannich reaction at a temperature of 66°C for 2 hours and then reprecipitated with water to obtain 1.3 g of a diethylaminomethylated copolymer. Elementary analysis of the resulting copolymer showed an N-content of 9.7%. 1 g of this diethylaminomethylated copolymer was then reacted with methyl bromide in a mixed solvent of tetrahydrofuran-methanol (50:50 by volume) at a temperature of 65°C for 3 hours. After completion of the reaction, the resulting solution was re-precipitated with ethyl ether to obtain 1.4 g of an N,N-diethyl N-methylammoniummethylated copolymer as a white precipitate. Elementary analysis of this copolymer showed an N-content of 6.2% and a Br-content of 21%. This copolymer was used as a polycation in the subsequent preparation of a polyion complex.

0.5 g of this polycation was dissolved in 100 ml of a 10% aqueous hydrochloric acid solution. Separately, 0.5 g of the polyanion as prepared in Example 36 was dissolved in 100 ml of water. The resulting mixture was then reacted in the same manner as Example 36 (the equivalent ratio of the polycation to the polyanion is 0.56) to form 0.32 g of a polyion complex. Elementary analysis of this polyion complex showed an N-content of 4.5% and an S-content of 6.9%. This polyion was found to be easily soluble in Solvent C. It was also found that the solubility in Solvent C increases when dimethylsulfoxide was added in an amount of 5%.

EXAMPLE 39

(Polycation Copolymer — Polyanion Homopolymer)

A radical copolymer of p-acetoxystyrene and methyl methacrylate (p-acetoxystyrene content, 55 mol%; number average molecular weight about 450,000) was hydrolyzed with an ethanolic hydrochloric acid to obtain poly(p-hydroxystyrene-comethacrylic acid). 1 g of this poly(p-hydroxystyrene-comethacrylic acid) was dissolved in a mixed solvent of water-dimethylformamide ((30:70 by volume) which was prepared from dimethylamine and paraformaldehyde followed by a Mannich reaction at a temperature of 100°C for 3 hours to obtain 1.5 g of a dimethylaminomethylated copolymer. Elementary analysis of this copolymer showed an N-content of 8.1%. 1.0g of this dimethylaminomethylated copolymer was quaternized with benzylchloride in methanol as a solvent to obtain 1.3 g of a white powdered polymer. Elementary analysis of this polymer showed an N-content of 4.82% and a Cl-content of 12%. This polymer was used as a polycation in the subsequent preparation of a polyion complex. The polyanion used in this Example was the same compound as used in Example 36.

0.5 g of the above obtained polycation and 0.5 g of the above described polyanion (the equivalent ratio of the polycation to the polyanion is 0.92) were reacted in water as a solvent in the same manner as described in Example 36 to obtain 0.78 g of a polyion complex. Elementary analises of this polyion complex showed an N-content of 2.1%, an S-content of 5.9% and an N/S ratio of 0.81. This polyion complex was found to be easily soluble in Solvent C.

EXAMPLE 40

Polycation Copolymer — Polyanion Homopolymer)

A copolymer of p-hydroxystyrene and acrylic acid (p-hydroxystyrene content, 50 mol%) was dissolved in ethanol. The resulting solution was reacted with dimethylamine and paraformaldehyde at a temperature of 80°C for 4 hours to obtain a dimethylaminomethylated copolymer. Elementary analysis of this copolymer showed an N-content of 5.39%. This copolymer was used as a polycation in the subsequent preparation of a polyion complex. The polyanion used in this Example was the same compound as used in Example 36.

0.5 g of the above obtained polycation was dissolved in 100 ml of methanol. Separately, 0.5 g of the polyanion (prepared in Example 36) was dissolved in 100 ml of methanol. The methanolic solution of the polyanion thus prepared was then added dropwise to the methanolic solution of the polycation at a temperature of 0°C while stirring (the equivalent ratio of the polycation to the polyanion is 0.71), and the resulting mixture became clouded. After allowing to react at room temperature for an additional one hour, the formed polyion complex was filtered, washed thoroughly with methanol and dried in vacuo to obtain 0.58 g of a white powdered polyion complex. Elementary analysis of this polyion complex showed an N-content of 3.0%, an S-content of 7.3% and an N/S ratio of 0.95. This polyion complex was found to be easily soluble in Solvent C.

EXAMPLE 41

(Polycation Homopolymer — Polyanion Copolymer)

45 g of a copolymer of p-hydroxystyrene and acrylic acid (p-hydroxystyrene content, 50 mol%; number average molecular weight, about 110,000) was uniformly dissolved in a mixed solvent of dioxane — acetic acid (70:30 by volume). 500 ml of a dioxane solution containing 270 g of chlorosulfonic acid was then added dropwise to the resulting solution at a temperature of 0°C. After allowing to react at a temperature of 80°C for 3 hours, the resulting mixture was re-precipitated with a large amount of n-heptane. The precipitate thus obtained was dissolved in 500 ml of water and the solution was dialized against distilled water using a cellulose tube for 2 days. The resulting dialysate was concentrated using an evaporator and then freeze-dried to obtain 65 g of a white powder. Elementary analysis of this powder showed a C-content of 42.4% and an S-content of 15.2%. This powder was used as a polyanion in the subsequent preparation of a polyion complex.

0.5 of the above obtained polyanion and 0.5 g of a polycation of a trimethylammoniummethylated poly-p-hydroxystyrene bromide ([N]=1.58; Br/N ratio, 1.1; [$\eta$]=2.4; number average molecular weight, about 1,780,000) was reacted in water as a solvent in the same manner as described in Example 36 (the equivalent ratio of the polycation to the polyanion is 0.55) to obtain a polyion complex. Elementary analysis of this polyion complex showed an N-content of 3.7%, an S-content of 7.9% and an N/S ratio of 1.07). The polyion complex thus obtained was found to be easily soluble in Solvent C.

EXAMPLE 42

(Semi-quaternized Polycation Homopolymer — Polyanion Copolymer)

Poly-p-hydroxystyrene (number average molecular weight, about 360,000) was reacted with dimethylamine and paraformaldehyde in ethanol solvent by a Mannich reaction at a temperature of 80°C for 2 hrs to obtain dimethylaminomethylated poly-p-hydroxystyrene having an N-content of 10.9% and an [N] value of 1.68. This polymer was quaternized with 0.5 mol of methyl bromide per an amino group contained in the polymer in methanol as a solvent at a temperature of 65°C for 10 hours to obtain a white powdered poly-p-hydroxystyrene which contains tertiary amino groups and quaternary ammonium groups. This poly-p-hydroxystyrene had an N-content of 6.97%, a Br-content 18% and a Br/N ratio of 0.45, which is easily soluble in water. The polymer thus obtained was used as a polycation in the subsequent preparation of a polyion complex. The polyanion used in this Example was the same compound as used in Example 41.

0.5 g of the thus obtained polycation was reacted with 0.5 g of the polyanion described above in water as a solvent in the same manner as in Example 36 (the equivalent ratio of the polycation to the anion is 0.73) to obtain 0.41 g of a polyion complex. Elementary analysis of this polyion complex showed an N-content of 3.4%, an S-content of 8.2% and an N/S ratio of 0.95. This polyion complex was found to be easily soluble in Solvent C.

EXAMPLE 43

(Polycation Homopolymer (N) — Polyanion Homopolymer)

Poly-p-hydroxystyrene (number average molecular weight, about 360,000) was reacted with dimethylamine and paraformaldehyde in ethanol as a solvent by a Mannich reaction at a temperature of 80°C for 2 hours to obtain dimethylaminomethylated poly-p-hydroxystyrene having an N-content of 10.9% and an [N] value of 1.68. The polymer thus obtained was used as a polycation in the subsequent preparation of a polyion complex. In this Example, poly(potassium styrenesulfonate) which is a Redox polymer of potassium styrenesulfonate ([$\eta$]=2.79; number average molecular weight, about 1,480,000) was used as a polyanion.

0.5 g of the above polycation was dissolved in 100 ml of a 10% aqueous hydrochloric acid solution. Separately, 0.87 g of the polyanion described above was dissolved in 100 ml of water. The polycation solution was reacted with the polyanion solution in the same manner as described in Example 36 (the equivalent ratio of the polycation to the polyanion is 1.0) to obtain 0.9 g of a white powdered polymer. From the results of IR analysis, it was confirmed that the product thus obtained is a polyion complex in which the polycation and the polyanion are bonded ionically. Elementary analysis showed an N-content of 4.2%, an S-content of 9.9% and an N/S ratio of 0.97. This polyion complex was found to be easily soluble in Solvent C.

EXAMPLE 44

2 g of the polyion complex which can be obtained in Example 43 was uniformly dissolved in 15 g of Solvent C (casting concentration, 11.8%) to obtain a slightly yellow transparent viscous solution. After allowing the resulting solution to react with stirring for 5 minutes, the reaction mixture was cast on an acrylic plate having a smooth surface in 0.3 mm thickness. After the solvent was allowed to evaporate at room temperature for 2 minutes, the resulting plate was immersed in an ice water at 0°C. The surface became clouded within about 30 seconds, and a white opaque cast film was separated from the acrylic plate. This polyion complex cast film had the following physical properties;

Water-Content: 65%
Film-thickness: 0.38 mm
Water-Permeability: 0.021 ml/min-cm$^2$ (1 Kg/cm$^2$)
Tensile Strength: 5.2 Kg/cm$^2$
Ultrafiltration Property (Solute Rejection):
    Creatinin, 0%

Vitamin B$_{12}$, 0%
Cytochrome C, 95%
Hemoglobin, 100%

EXAMPLE 45

The same procedure as described in Example 44 was followed except that 7.5% of the casting concentration was employed in this example to obtain a polyion complex cast film. The thus obtained white opaque polyion complex cast film had a water-content of 90%, a film-thickness of 0.37 mm and a water-permeability of 1.5 ml/min-cm$^2$ (1 Kg/cm$^2$).

EXAMPLE 46

2 g of the polyion complex obtained in Example 41 was uniformly dissolved in 12 g of Solvent C (casting concentration, 14.3%) to obtain a slight ocherous, transparent viscous solution. After allowing the resulting solution to react for 5 minutes with stirring, the reaction mixture was cast on an acrylic plate having a smooth surface in 0.3 mm thickness. After the solvent was allowed to evaporate at room temperature for 2 minutes, the resulting plate was immersed in an ice water at 0°C to obtain a white opaque film. The polyion complex film thus obtained had a water-content of 74.0%, a film-thickness of 0.323 mm, a water-permeability of 0.101 ml/min-cm$^2$ (1 Kg/cm$^2$), a tensile strength of 8.5 Kg/cm$^2$ and the following ultrafiltration property (solute rejection):

Vitamine B$_{12}$, 10%
Cytochrome C, 100%

While the invention has been described in detail and with reference to specific embodiments thereof, it will be apparent to one skilled in the art that various changes and modifications can be made therein without departing from the spirit and scope thereof.

What we claim is:
1. A process for preparing a polyion complex, which comprises reacting at 0° to 100°C
   a. a polyanion selected from the group consisting of polymers expressed by the following general formula

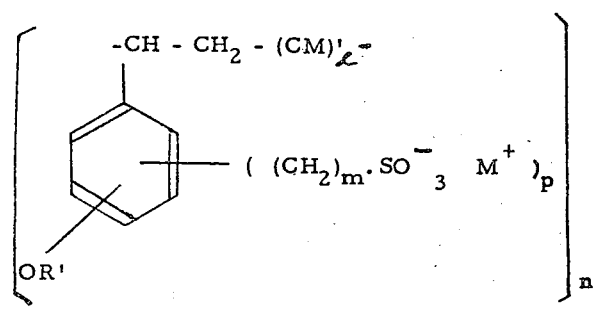

wherein p, l and n are the same as defined in section b) below m is 0 or 1; M is —H, an ammonium group, an alkali metal, or an alkaline earth metal; R' is H, or —SO$_3^-$M$^+$, M$^+$ or a combination thereof; OR' is para or meta to the vinyl group of the starting hydroxystyrene; and (CM)' is styrene, methyl methacrylate, methyl acrylate, acrylonitrile, or maleic anhydride, polystyrene sulfonic acid, polyvinyltoluene sulfonic acid, polyvinylsulfonic acid, and alkali metal salts or alkaline earth metal salts of the above acid-type polyanions; with b. a polycation with a polycation of the following general formula

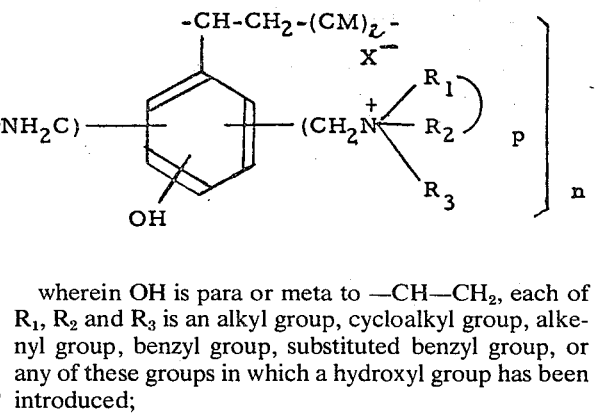

wherein OH is para or meta to —CH—CH$_2$, each of R$_1$, R$_2$ and R$_3$ is an alkyl group, cycloalkyl group, alkenyl group, benzyl group, substituted benzyl group, or any of these groups in which a hydroxyl group has been introduced;

forms a nitrogen-containing or oxygen-containing heterocyclic group, or represents a dialkanolamine or N-alkylalkanolamine; R$_3$ is CH$_2$COOH, H, or O forming a coordination bond with N of a quaternary ammonium group; X is halogen or ROSO$_3$, wherein R is a lower alkyl group; p is above 0 but below 2, p' is at least 0 but below 2, and the sum of p and p' is above 0 but below 2; n is at least 3; (CM) represents a vinyl monomer; and l is any number including 0 in a solvent wherein the concentration of the polycation and the polyanion in the solvent is 0.01 to 80% by weight.

2. The process of claim 1 wherein each of R$_1$, R$_2$ and R$_3$ is a branched chain alkyl group containing 1 to 20 carbon atoms, a cycloalkyl group containing 3 to 12 carbon atoms, an alkenyl group containing 2 to 20 carbon atoms, a benzyl group, a substituted benzyl group containing an alkyl group containing 1 to 4 carbon atoms, a halogen atom or a nitro group, or any of the above groups in which a hydroxyl group has been introduced;

forms a 4- to 6-membered nitrogen-containing or oxygen-containing heterocyclic group, or represents a dialkanolamine having an alkanol group containing 1 to 4 carbon atoms or N-alkylalkanolamine having an alkyl group and alkanol group containing 1 to 4 carbon atoms; X is iodine, bromine, chlorine, or ROSO$_3$ wherein R is a methyl or ethyl group; (CM) is maleic anhydride, methyl methacrylate, methyl acrylate, ethyl acrylate, acrylonitrile, acrylamide, or a carboxylated product of any of these monomers; $n$ is 3 to 20,000 and $l$ is at least 0 but below 9.

3. The process of claim 2 wherein the polycation is trimethylammoniummethylated poly-p-hydroxystyrene bromide.

4. The process of claim 2 wherein the polycation is N,N-dimethyl-N-benzylammoniummethylated poly-p-hydroxystyrene chloride.

5. The process of claim 2 wherein the polycation is trimethylammoniummethylated poly-m-hydroxystyrene bromide.

6. A polyion complex solution suited for film formation, said solution consisting of a polyion complex derived from a polyanion selected from the group consisting of polymers expressed by the following general formula

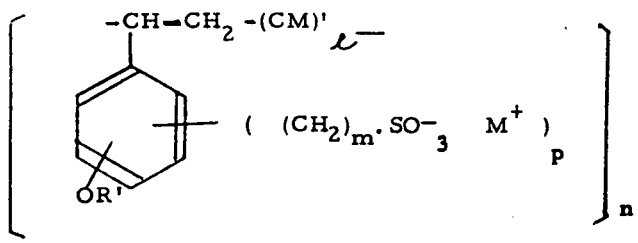

wherein $p$, and $n$ are the same as defined hereinafter; $m$ is 0 or 1; $M$ is H, an ammonium group, an alkali metal, or an alkaline earth metal; $R'$ is H, or $-SO_3^-M^+$, $M^+$ or a combination thereof; $OR'$ is para or meta to the vinyl group of the starting hydroxystyrene; and $(CM)'$ is styrene, methyl methacrylate, methyl acrylate, acrylonitrile, or maleic anhydride, polystyrenesulfonic acid, polyvinyltoluenesulfonic acid, polyvinylsulfonic acid, and alkali metal salts or alkaline earth metal salts of the above acid-type polyanions and a polycation of the following general formula wherein OH is para or meta to $-CH-CH_2$; each of $R_1$, $R_2$ and $R_3$ is an alkyl group, cycloalkyl group, alkenyl group, benzyl group, substituted benzyl group, or any of these groups in which a hydroxyl group has been introduced;

forms a nitrogen-containing or oxygen-containing heterocyclic group, or represents a dialkanolamine or N-alkylalkanolamine; $R_3$ is $CH_2COOH$, H, or O forming a coordination bond with N of a quaternry ammonium group; X is halogen or $ROSO_3$ wherein R is a lower alkyl group; $p$ is above 0 but below 2, $p'$ is at least 0 but below 2, and the sum of $p$ and $p'$ is above 0 but below 2; $n$ is at least 3; (CM) represents a vinyl monomer; and $l$ is any number including 0, in a three-component solvent consisting of water, at least one water-miscible organic solvent and an acid, base or salt.

7. The process of claim 1 wherein said polyanion is poly (sodium p-styrenesulfonate).

8. The process of claim 1 wherein said polyanion is sulfonated poly-p-hydroxystyrene.

9. The process of claim 1 wherein said polyanion is poly(potassium p-styrenesulfonate).

10. A polyion complex derived from a polyanion selected from the group consisting of polymers expressed by the following general formula

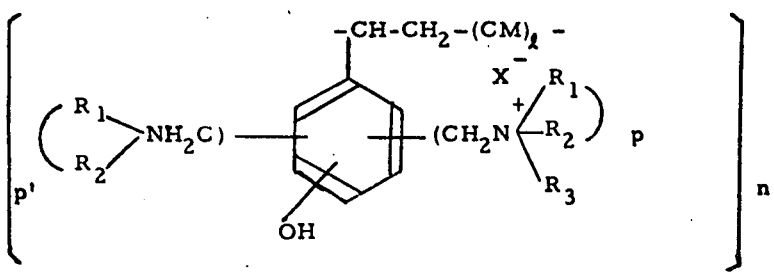

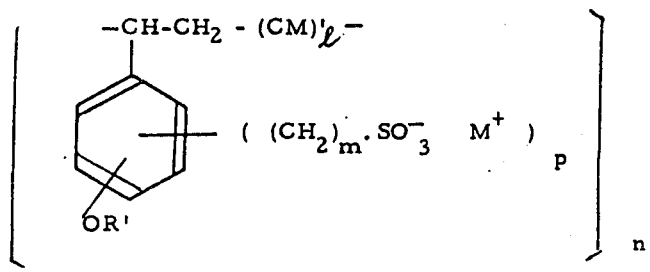

wherein $p$, $l$ and $n$ are the same as defined hereinafter; $m$ is 0 or 1; M is H, an ammonium group, an alkali metal, or an alkaline earth metal; R' is H, or —SO⁻₃M⁺, M⁺ or a combination thereof; OR' is para or meta to the vinyl group of the starting hydroxystyrene; and (CM)' is styrene, methyl methacrylate, methyl acrylate, acrylonitrile, or maleic anhydride, polystyrenesulfonic acid, polyvinyltoluenesulfonic acid, polyvinylsulfonic acid, and alkali metal salts or alkaline earth metal salts of the above acid-type polyanions and a polycation of the following general formula

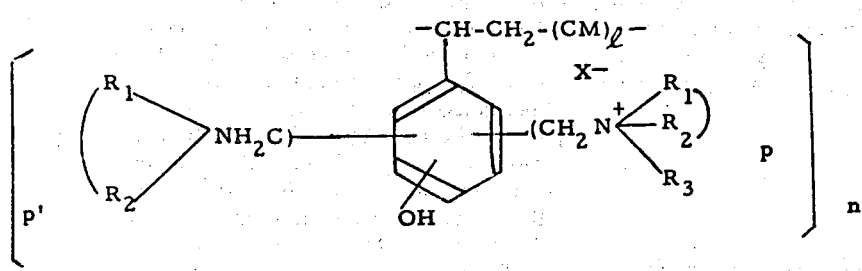

wherein OH is para or meta to —CH—CH₂; each of $R_1$, $R_2$ and $R_3$ is an alkyl group, cycloalkyl group, alkenyl group, benzyl group, substituted benzyl group, or any of these groups in which a hydroxyl group has been introduced;

forms a nitrogen-containing or oxygen containing heterocyclic group, or represents a dialkanolamine or N-alkylalkanolamine; $R_3$ is CH₂COOH, H, or O forming a coordination bond with N of a quaternary ammonium group; X is halogen or ROSO₃ wherein R is a lower alkyl group; $p$ is above 0 but below 2, $p'$ is at least 0 but below 2, and the sum of $p$ and $p'$ is about 0 but below 2; $n$ is at least 3; (CM) represents a vinyl monomer; and $l$ is any number including 0.

11. The process of claim 1 wherein said solvent is selected from the group consisting of water, water-miscible organic solvents, two-component mixtures consisting of water and at least one water-miscible organic solvent, and three-component mixtures consisting of water, at least one water-miscible organic solvent and an acid, base or salt.

12. The process of claim 11 wherein said water-miscible organic solvent is selected from the group consisting of alcohols containing 1 to 4 carbon atoms, organic acids containing 1 to 4 carbon atoms, 5- to 6-membered cyclic ethers, ketones containing 3 to 6 carbon atoms, phenols and N, S or P containing polar solvents.

13. The process of claim 12 wherein said water-miscible organic solvent is selected from the group consisting of methanol, ethanol, tetrahydrofuran, dioxane, acetone, cyclohexanone, phenol, acetonitrile, pyridine, N-methylpyrrolidone, morpholine, dimethyl formamide, dimethyl sulfoxide, and hexamethyl phosphoramide.

14. The process of claim 11 wherein said acid, base or salt is selected from the group consisting of hydrochloric acid, hydrobromic acid, sulfuric acid, trichloroacetic acid, sodium hydroxide, potassium hydroxide, calcium hydroxide, aqueous ammonia, sodium chloride, sodium bromide, potassium chloride, potassium iodide, calcium chloride, magnesium chloride, sodium nitrate, sodium sulfate, sodium perchlorate and sodium persulfate.

15. A film prepared from a polyion complex derived from a polyanion selected from the group consisting of polymers expressed by the folllowing general formula

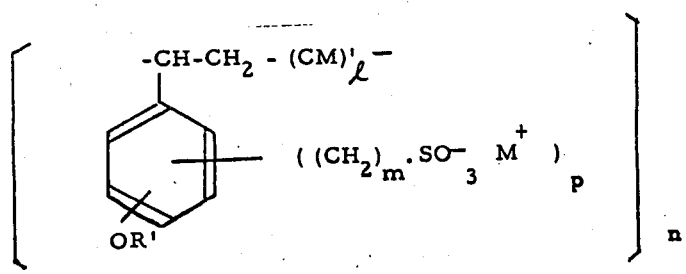

wherein $p$, $l$ and $n$ are the same as defined hereinafter; $m$ is 0 or 1; M is H, an ammonium group, an alkali metal, or an alkaline earth metal; R' is H, or —SO⁻₃M⁺, M⁺ or a combination thereof; OR' is para or meta to the vinyl group of the starting hydroxystyrene; and (CM)' is styrene, methyl methacrylate, methyl acrylate, acrylonitrile, or maleic anhydride, polystyrenesulfonic acid, polyvinyltoluenesulfonic acid, polyvinylsulfonic acid, and alkali metal salts or alkaline earth metal salts of the above acid-type polyanions and a polycation of the following general formula

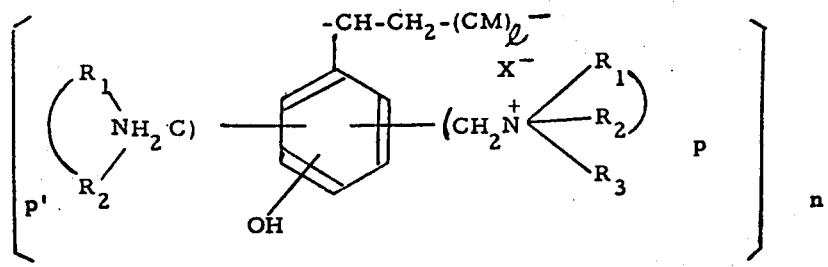

wherein OH is para or meta to —CH—CH$_2$; each of R$_1$, R$_2$ and R$_3$ is an alkyl group, cycloalkyl group, alkenyl group, benzyl group, substituted benzyl group, or any of these groups in which a hydroxyl group has been introduced

forms a nitrogen-containing or oxygen-containing heterocyclic group, or represents a dialkanolamine or N-alkylalkanolamine; R$_3$ is CH$_2$COOH, H, or O forming a coordination bond with N of a quaternary ammonium group; X is halogen or ROSO$_3$ wherein R is a lower alkyl group; $p$ is above 0 but below 2, $p'$ is at least 0 but below 2, and the sum of $p$ and $p'$ is above 0 but below 2; $n$ is at least 3; (CM) represents a vinyl monomer; and $l$ is any number including 0.

16. The process of claim 1 wherein the equivalent ratio of the polycation to the polyanion is 0.1 to 10.

17. The process of claim 1 wherein the proportion of the quaternary ammonium group in the polycation is 20 to 100% of the total N-numbers.

18. The process of claim 1, wherein the reaction of the polyanion and the polycation is conducted for a period of 5 minutes to 20 hours.

* * * * *